G. W. PICKARD.
RADIO TELEGRAPHY AND TELEPHONY RECEIVER.
APPLICATION FILED MAR. 20, 1914.
1,249,482.
Patented Dec. 11, 1917.
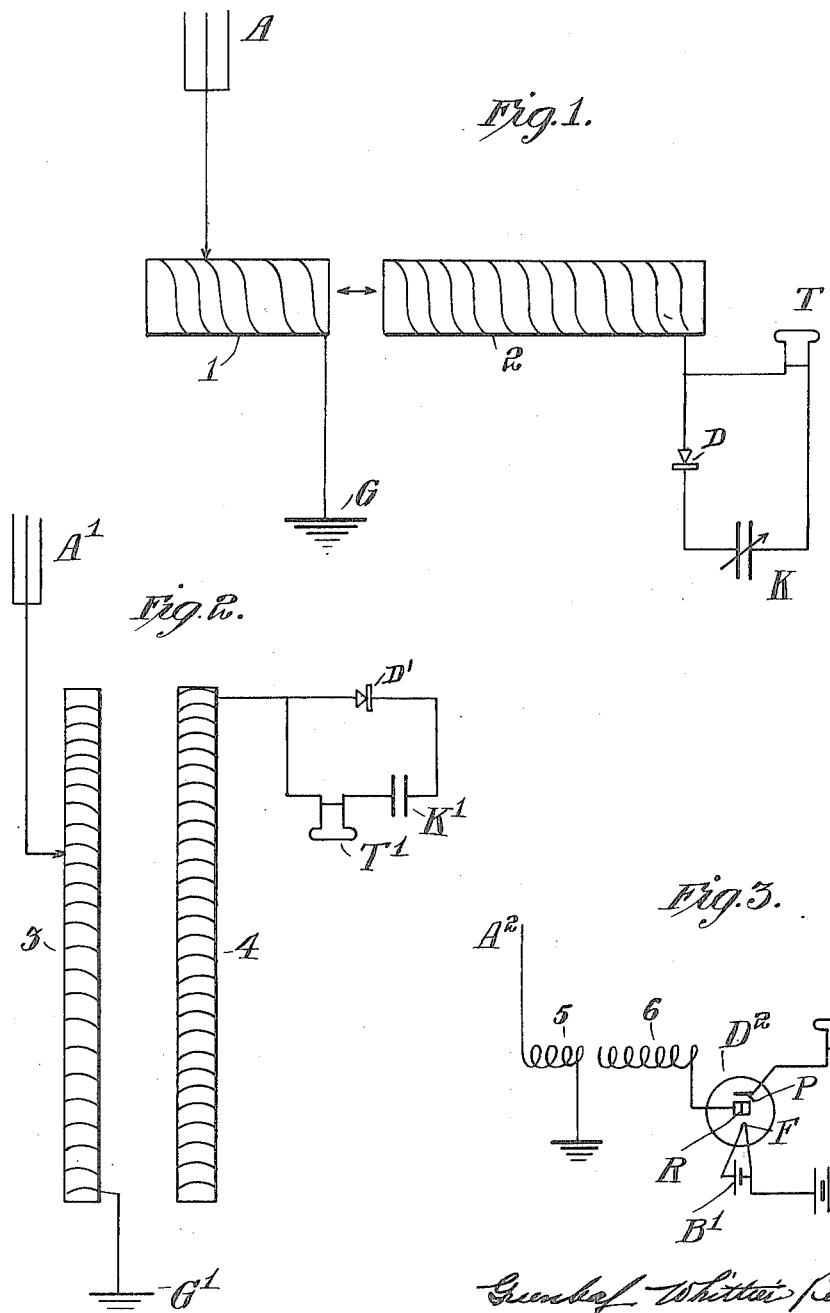

UNITED STATES PATENT OFFICE.

GREENLEAF WHITTIER PICKARD, OF AMESBURY, MASSACHUSETTS, ASSIGNOR TO WIRELESS SPECIALTY APPARATUS COMPANY, OF BOSTON, MASSACHUSETTS, A CORPORATION OF NEW YORK.

RADIO TELEGRAPHY AND TELEPHONY RECEIVER.

1,249,482.   Specification of Letters Patent.   Patented Dec. 11, 1917.

Application filed March 20, 1914. Serial No. 826,036.

*To all whom it may concern:*

Be it known that I, GREENLEAF WHITTIER PICKARD, a citizen of the United States of America, and a resident of the town of Amesbury, State of Massachusetts, have invented certain new and useful Improvements in Radio Telegraphy and Telephony Receivers, the principles of which are set forth in the following specification and accompanying drawings, which disclose the form of the invention which I now consider to be the best of the various forms in which the principles of the invention may be embodied.

This invention relates to improvements in receiving apparatus for radio telegraphy and telephony, and consists of the apparatus and arrangements thereof disclosed herein, the object of the invention being to provide simplified and more efficient apparatus, particularly with the use of oscillation detectors of high resistance which require considerable potential to be best operated.

Of the drawings, which are largely diagrammatic, Figure 1 shows a coupling of the potential-raising coils 1 and 2 which is chiefly electromagnetic; Fig. 2 shows a coupling of the similar coils 3 and 4 which is chiefly electrostatic; and Fig. 3 shows the telephone-circuit connections with a high resistance detector of the vacuum or audion type.

I have found that better results are accomplished by dispensing with the closed or secondary circuit heretofore employed with the grounded antenna circuit A, 1, G, (Fig. 1) and simply employing a coil, as 2, of greater number of turns than coil 1 in order to step up the potential and attaching the high resistance detector D to the end of coil 2 where it is operated by the potential changes thereat. The direct current pulses resulting from the action of the detector D operate in a circuit D, T, K, wherein T is a suitable indicator as a telephone receiver and K a suitable condenser representing means for adjusting this telephone circuit to the frequency of the current pulses therein.

The proper end of the coil 2 for the connection of the detector depends on various conditions, including the direction of winding of coil 2 relative to coil 1, the form of coil 2, its degree of proximity to coil 1 or other conductors, etc. As there are only two ends of coil 2, the simplest way of determining the proper end to connect the detector is to try it on each end, the one giving the loudest signals in telephone T being of course, the more efficient.

The detector D may be any suitable type which operates under the above conditions. For example, it may be any of the so-called crystal rectifiers (such as the silicon of my prior patents), particularly those of higher resistance; or it may be of the audion type as illustrated in Fig. 3.

All the above applies also to the electrostatic coupling arrangement shown in Fig. 2, of coils 3 and 4.

In Fig. 3 the detector $D^2$ is an audion, with vacuum glass tube inclosing the usual plate P, grid R and filament F. As in Figs. 1 and 2 this detector is attached to one end of the coil, as 6, this connection being made to the grid R. Also, as in Figs. 1 and 2, the detector $D^2$ is connected so that the current produced from it can operate a telephone, as $T^2$. Incidental to the operation of this audion type of detector, the telephone circuit includes a battery B in the lead connected to the filament F, also another battery $B^1$ is connected in the local circuit of filament F.

In any case, the antenna coil (1, 3 or 5) may be adjusted to adjust the antenna to the wave-length of the desired signals; but no such adjustment of the coöperating coil is needed. The selection of the proper coil to use at 2, 4 or 6, for all adjustments of coils 1, 3 or 5, is readily accomplished by constructing it so as to be adapted to produce the best results with a given telephone-detector circuit as T, K, D. This construction may be effected by loosely coupling a coil to a source of oscillations of the order of frequency corresponding to the range of adjustments of the antenna coil, and then removing parts of the coil winding or taking parts of it off until the maximum response is heard in the telephone. This is an old method and was described at an early date by Tesla in his publications. It is important that coöperating coil 2 have variable coupling with coil 1, as indicated by the double arrow in Fig. 1, for adjustment of the coupling to different wave-lengths of the receiving conductor.

I claim:

A radio receiving system which comprises a receiving coil constituting the primary of a step-up potential transformer, and connected in an antenna of variable wavelength; and a substantially open-circuited and permanently-adjusted secondary therefor, which consists of a constant-inductance potential-raising coil and a high-resistance detector; said detector being unilaterally attached to said potential-raising coil at a point where the detector is subjected to the potential changes effected by said coil; and said potential raising coil having a sufficiently greater number of turns than its primary and having a variable coupling therewith, whereby the permanently-adjusted secondary may act effectively, at any of the various antenna wave-lengths.

GREENLEAF WHITTIER PICKARD.

Witnesses:
J. ALBERT PROCTOR,
M. C. HANNON.